(12) United States Patent
Andersson et al.

(10) Patent No.: US 7,402,120 B2
(45) Date of Patent: Jul. 22, 2008

(54) PLANET TRANSMISSION, DRIVE DEVICE COMPRISING THE PLANET TRANSMISSION AND BRAKE DISC FOR THE PLANET TRANSMISSION

(75) Inventors: Thomas Andersson, Eskilstuna (SE); Timothy Kingston, Eskilstuna (SE)

(73) Assignee: Volvo Construction Equipment, Eskilstuna (SE)

( * ) Notice: Subject to any disclaimer, the term of this patent is extended or adjusted under 35 U.S.C. 154(b) by 0 days.

(21) Appl. No.: 11/618,255

(22) Filed: Dec. 29, 2006

(65) Prior Publication Data
US 2007/0105686 A1 May 10, 2007

Related U.S. Application Data

(63) Continuation of application No. PCT/SE2005/000926, filed on Jun. 15, 2005.

(30) Foreign Application Priority Data
Jun. 30, 2004 (SE) .................................... 0401688

(51) Int. Cl.
*F16H 3/44* (2006.01)
*B60K 17/04* (2006.01)

(52) U.S. Cl. ...................... 475/323; 180/372

(58) Field of Classification Search .............. 475/323, 475/325, 326, 327, 328, 331; 180/372, 369
See application file for complete search history.

(56) References Cited

U.S. PATENT DOCUMENTS

| | | | | |
|---|---|---|---|---|
| 1,029,610 | A * | 6/1912 | Harrington | 475/298 |
| 1,210,461 | A * | 1/1917 | Glick | 475/305 |
| 1,646,126 | A * | 10/1927 | Tuttle | 475/305 |
| 6,090,006 | A * | 7/2000 | Kingston | 475/323 |
| 6,817,963 | B1 * | 11/2004 | Solka | 475/323 |
| 6,890,282 | B2 * | 5/2005 | Oberstarr | 475/323 |

FOREIGN PATENT DOCUMENTS

| | | |
|---|---|---|
| GB | 1455069 A | 11/1976 |
| WO | 9903699 A1 | 1/1999 |
| WO | 03039900 A1 | 5/2003 |
| WO | 2004018248 A1 | 3/2004 |

* cited by examiner

*Primary Examiner*—Roger Pang
(74) *Attorney, Agent, or Firm*—Novak Druce + Quigg LLP

(57) ABSTRACT

A planet transmission (1) for a land vehicle including a planet carrier (7), which is designed for rotation and has at least one journal (8) for supporting a planet wheel (6), and a brake (2), a first set of brake discs (10) being rotationally locked to the planet carrier (7). The brake discs (10) in the first set comprise means (17) for rotationally locking the brake discs (10) directly to the planet wheel journal. A drive device for a wheel of a vehicle is also disclosed that includes the planet transmission (1), as is a brake disc (10) for the planet transmission (1).

9 Claims, 2 Drawing Sheets

PLANET TRANSMISSION, DRIVE DEVICE COMPRISING THE PLANET TRANSMISSION AND BRAKE DISC FOR THE PLANET TRANSMISSION

CROSS-REFERENCE TO RELATED APPLICATIONS

The present application is a continuation patent application of International Application No. PCT/SE2005/000926 filed 15 Jun. 2005 which is published in English pursuant to Article 21(2) of the Patent Cooperation Treaty and which claims priority to Swedish Application No. 0401688-7 filed 30 Jun. 2004. Said applications are expressly incorporated herein by reference in their entirety.

FIELD

The invention relates primarily to the field of work machinery or work vehicles, such as wheel loaders, dumpers (frame-steered vehicles), backhoes (excavator-loaders), and excavators.

BACKGROUND

Rotationally locking a first set of brake discs to a planet carrier has been previously addressed such as in International Publication, WO 99/03699, for example. Therein, the brake discs are connected, via splines, on a radially outer surface of the planet carrier.

International Publication WO 04/18248 describes a planet transmission in which multiple planet wheel journals are connected to a common carrier for a brake disc. The brake disc is seated radially inside an axially projecting section of the common carrier. The brake is electrically controlled.

SUMMARY

The present invention relates to a planet transmission comprising a planet carrier which is adapted for rotation and has at least one journal for supporting a planet wheel, and a brake, a first set of brake discs being rotationally locked to the planet carrier. The invention further relates to a drive device for a wheel of a vehicle, the device comprising the planet transmission. The invention also relates to a brake disc for the planet transmission.

The drive device therefore comprises the planet transmission and forms what is commonly final drive, or hub-mounted reduction gear. The wheel is then arranged rotationally locked on a hub and the planet transmission is connected between a drive shaft and the hub. The drive shaft is driven by an angular gear, or center gear, which is in turn driven by the vehicle engine by way of a transmission system.

Arranging a planet transmission on each drive wheel in this way produces a reduction in rotational speed from the drive shaft to the hub and an increase in torque from the drive shaft to the hub. A first object of the invention is to provide a planet transmission which minimizes the number of parts and/or is as easy and thereby as cost-effective to machine as possible. A further object is to achieve as compact a solution as possible.

This first object is achieved in that the brake discs in the first set comprise means for rotationally locking the brake discs directly to the planet wheel journal. This creates the prerequisite conditions for ensuring that overall the brake has a smaller outside diameter than when the brake discs are seated radially outside the planet carrier. In order to be able to support the planet wheel on the one hand and multiple brake discs on the other, the planet wheel journals are longer than hitherto known planet wheel journals.

According to a preferred embodiment each of the brake discs in the first set has at least one hole, in which said planet wheel journal is received. This connection entails less machining than when a splined connection is used.

According to a preferred embodiment the brake discs are arranged closer to the free end of the planet wheel journal than the planet wheel.

A second object of the invention is to provide a brake disc, designed for rotation, for a planet transmission which creates the prerequisites for minimizing the number of parts in the planet transmission and/or for making the machining as easy and thereby as cost-effective as possible.

This second object is achieved in that it comprises means for rotationally locking directly to a planet wheel carrier journal. The brake disc preferably comprises at least one hole for receiving a journal of a planet carrier for rotationally locking to the planet carrier.

A further object of the invention is to provide a device for driving a wheel of a vehicle which minimizes the number of parts and/or makes machining as easy and thereby as cost-effective as possible. This is achieved in by use of the planet transmission according to the invention.

BRIEF DESCRIPTION OF THE DRAWINGS

The invention will be described in more detail below, with reference to the embodiments shown in the accompanying drawings in which.

DETAILED DESCRIPTION

Figure 1:
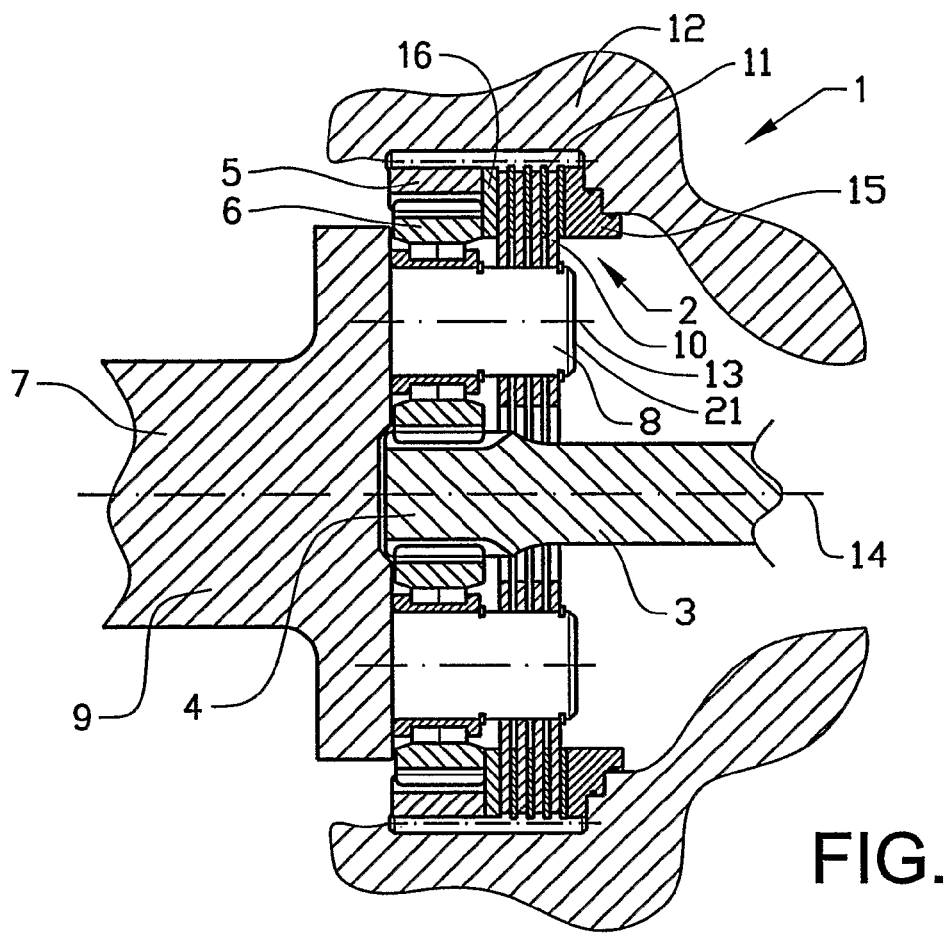
FIG. 1 shows a cut-away cross-sectional view of a planet transmission and integral brake in a device for driving a wheel of a vehicle.

FIG. 1 shows a planet transmission 1 with an integral brake 2. The planet transmission forms part of a device for driving a wheel of a vehicle (not shown). The drive device forms a so-called final drive, or hub-mounted reduction gear. The wheel is then arranged in a rotationally locked configuration on a hub and the planet transmission 1 is connected between a drive shaft 3 and the hub. The drive shaft 3 is driven by an angular gear, or center gear, which is in turn driven by the vehicle engine by way of a transmission system (not shown).

The planet transmission 1 comprises a sun gear 4, which is rotationally locked to the drive shaft 3 and which is designed to drive the planet transmission. The planet transmission 1 further comprises a fixed ring gear 5 and multiple planet wheels 6 which are arranged between the sun gear 4 and the ring gear 5 and meshed with them.

Figure 3:
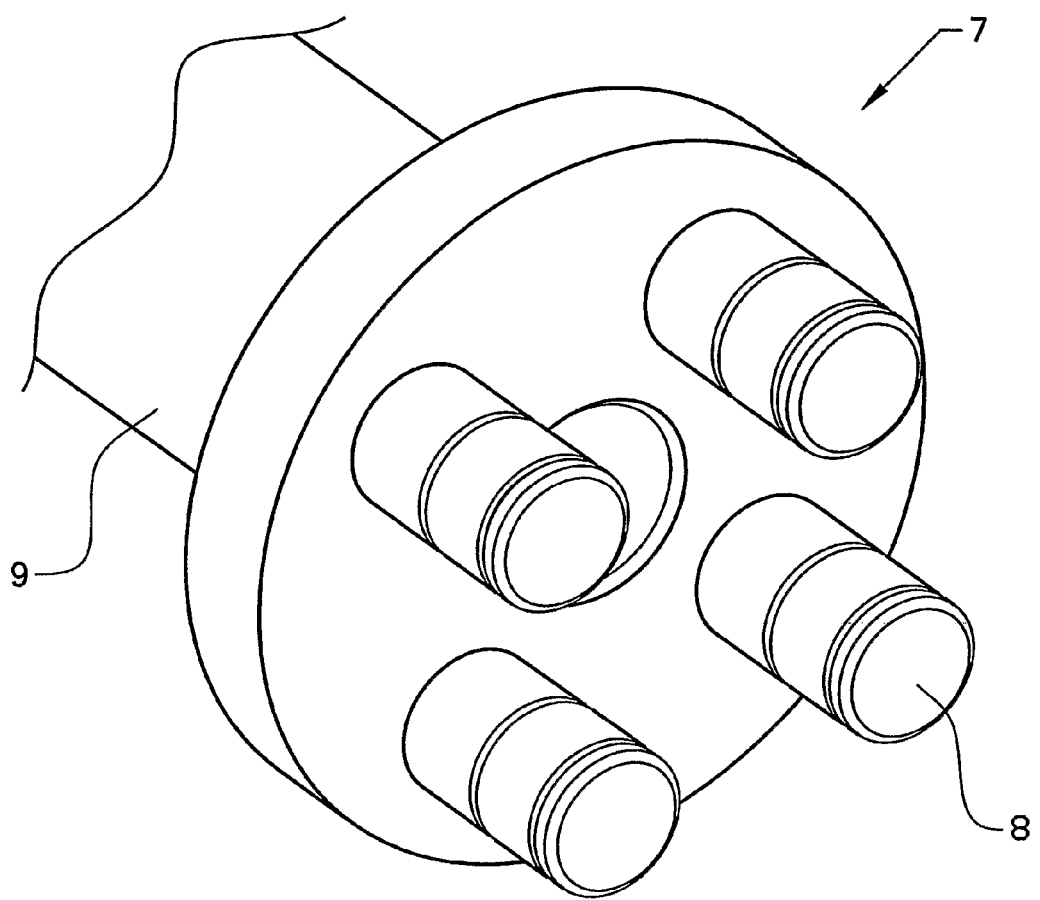
FIG. 3 shows a schematic perspective view of a planet carrier forming part of the planet transmission of FIG. 1.

The planet transmission 1 further comprises a planet carrier 7 having multiple projecting journals 8, each for supporting one of said planet wheels 6. The planet carrier 7 comprises a rotationally symmetrical body 9, which is intended to be rotationally locked to a wheel hub, suitably by way of a splined connection. The planet wheel journals 8 are integrally formed with the body 9. The planet wheel journals 8 are arranged equidistant from one another in the circumferential direction of the planet carrier. In the example shown the planet carrier 7 comprises four journals 8 (see FIG. 3), but the number of journals may also be fewer or more than four.

The brake 2 of the planet transmission 1 is a wet brake and comprises a first set of brake discs 10, which are rotationally locked to the planet carrier 7, and a second set of brake discs 11, which are arranged rotationally locked in a fixed housing 12, in the form of an axle housing. The brake discs 11 in the second set consequently consist of so-called stator discs.

The brake discs 10, 11 are arranged so that every other brake disc forms part of the first set and every second brake disc forms part of the second set. The brake discs 10 in the first set are displaceable along the planet wheel journal 8 in the axial direction 13 thereof. The brake discs 11 in the second set are arranged in the housing 12 so that they are displaceable in the same direction; that is to say, in a direction parallel to the axis of rotation 14 of the planet transmission. The housing 12 therefore comprises radially internal means 20 for engagement with the brake discs 11 in the second set, so that rotation of the brake discs is counteracted and so that the brake discs can be displaced parallel to their central axis 18. This means of engagement 20 may consist, for example, of a toothed structure in the inside surface of the housing 12 and of a correspondingly shaped toothed structure on the radially outer surface of the brake discs 11.

The brake 2 comprises a brake piston 15 designed, on activation, to press the brake discs 10, 11 together against a counter-pressure plate 16. The counter-pressure plate 16 is arranged against the fixed ring gear 5.

Figure 2:
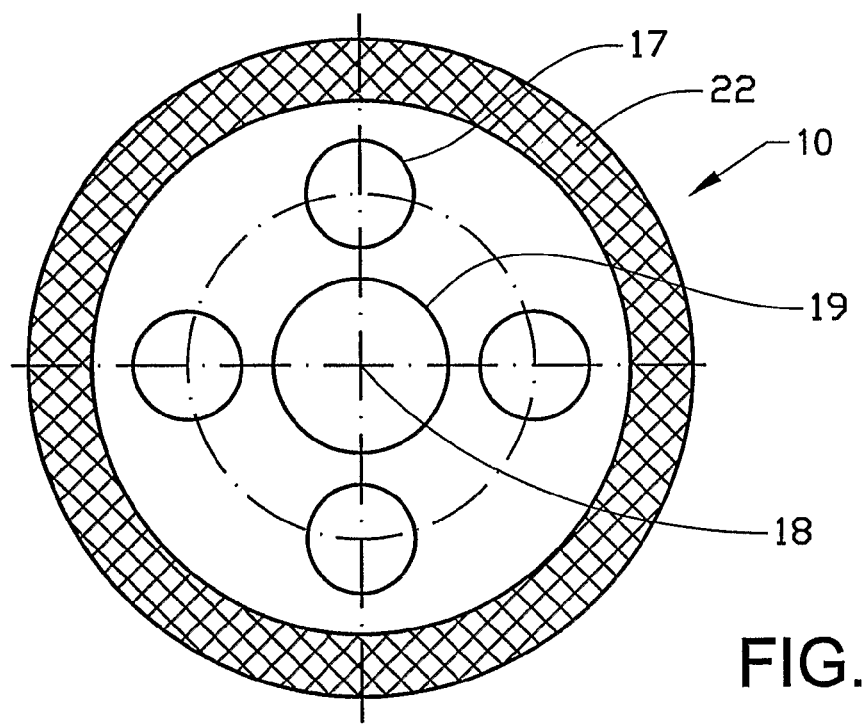
FIG. 2 shows a brake disc forming part of the planet transmission in FIG. 1.

Each of the brake discs 10 in the first set comprises connection means 17, serving as a locking member, for rotationally locking to at least one planet wheel journal 8 (see FIG. 2). This means of connection 17 comprises multiple through-holes 17 in which said planet wheel journals 8 are received. Rotational movement and torque transmitted between the planet carrier 7 and brake disc 10 are therefore transmitted between the relatively long planet wheel journals 8 and the holes 17 in the brake discs 10.

These holes 17 for the planet carrier journals 8 are arranged at a radial distance from the intended axis of rotation 18 of the brake disc 10, which is defined by the geometric center of the brake disc. The holes 17 are arranged equidistant from one another in the circumferential direction of the brake disc 10. In the example shown the brake disc 10 comprises four holes 17, but the number of holes may also be fewer or more than four, depending on the chosen number of planet wheel journals 8.

The holes 17 in the brake discs 10 therefore match the planet wheel journals 8. The holes 17 suitably have a diameter somewhat larger than the outside diameter of the planet wheel journals 8.

The brake discs 10 in the first set comprise an annular section 22 designed to be brought into contact with an adjacent brake disc 11 in the second set when braking. This contact section 22 is arranged radially outside the hole 17 for the planet carrier journal.

The fact that the planet carrier 7 is rotationally locked to the wheel hub means that the brake discs 10 in the first set rotationally locked to the planet wheel journals 8 rotate at the same speed as the wheel.

Each of the brake discs 10 in the first set comprises a central through-opening 19, through which the drive shaft 3 extends.

The through-opening 19 naturally has a larger diameter than the outside diameter of the drive shaft 3, so that the drive shaft 3 can rotate at a greater speed than the brake discs 10.

The brake discs 10, 11 are arranged closer to the free ends 21 of the planet wheel journal than the planet wheel 6.

The invention must not be regarded as being limited to the exemplary embodiments described above, a number of further variants and modifications being feasible without departing from the scope of the following claims.

For example, said connection means 17 for rotationally locking the brake discs 10 directly to the planet wheel journal 8 may comprise a number of sections projecting from each brake disk, which are intended to engage with a correspondingly shaped recess in each of the planet wheel journals.

What is claimed is:

1. A planet transmission (1) comprising:
   a rotatable planet carrier (7) comprising a plurality of planet wheel journals (8) configured to support a planet wheel (6);
   a brake (2); and
   a first set of brake discs (10) rotationally locked to the planet carrier (7), said first set of brake discs (10) comprising means (17) for rotationally locking said brake discs (10) directly to the plurality of planet wheel journals (8) and each of said brake discs (10) comprising a plurality of holes (17), each of said holes (17) receiving one planet wheel journal therein.

2. The planet transmission as recited in claim 1, wherein the brake discs (10) of said first set of brake discs (10) are displaceable along the planet wheel journal (8) in the axial direction (13) thereof.

3. The planet transmission as recited in claim 1, wherein the brake (2) comprises a second set of brake discs (11) that are displaceably arranged in a fixed housing (12), and wherein the brake discs (10) of the first set are interleaved with the brake discs (11) of the second set.

4. The planet transmission as recited in claim 1, wherein the planet transmission (1) comprises:
   a sun gear (4) configured to drive the planet transmission; and
   a fixed ring gear (5); and
   planet wheels (6) arranged between the sun gear (4) and the ring gear (5) and meshed therewith.

5. The planet transmission as recited in claim 4, wherein the sun gear (4) is rotationally locked on a drive shaft (3), and each of the brake discs (10) in the first set comprises a central through-opening (19) through which the drive shaft extends.

6. The planet transmission as recited in claim 1, wherein the brake discs (10, 11) are arranged closer to a free end (21) of the planet wheel journal (8) than to the planet wheel (6).

7. The planet transmission as recited in claim 1, wherein the planet carrier (7) comprises a body (9) and the planet wheel journal (8) is integrally formed with the body (9).

8. The planet transmission as recited in claim 1, wherein the planet transmission (1) constitutes a device for driving a wheel of a vehicle.

9. The planet transmission as recited in claim 8, wherein the planet carrier (7) is rotationally locked to a wheel hub.

* * * * *